United States Patent

Gray et al.

[11] Patent Number: 5,970,068
[45] Date of Patent: Oct. 19, 1999

[54] TELECOMMUNICATION SYSTEM WITH TRANSPORT PROTOCOL DEVICE FOR MIXING ASYNCHRONOUS SIGNALING TRAFFIC WITH TDM TRAFFIC ON A TDM BACKBONE

[75] Inventors: Tom Gray, Carp; Lee De Korte, Nepean; Mauricio Peres, Kanata, all of Canada

[73] Assignee: Mitel Corporation, Kanata, Canada

[21] Appl. No.: 08/716,319

[22] PCT Filed: Apr. 4, 1995

[86] PCT No.: PCT/CA95/00192

§ 371 Date: Mar. 19, 1997

§ 102(e) Date: Mar. 19, 1997

[87] PCT Pub. No.: WO95/27383

PCT Pub. Date: Oct. 12, 1995

[30] Foreign Application Priority Data

Apr. 5, 1994 [CA] Canada .................................. 2120542

[51] Int. Cl.[6] .............................. H04L 13/28; H04L 12/56
[52] U.S. Cl. ......................... 370/395; 370/400; 370/442; 370/474

[58] Field of Search ..................................... 370/389, 392, 370/395, 396, 398, 400, 401, 402, 403, 404, 405, 406, 410, 465, 468

[56] References Cited

U.S. PATENT DOCUMENTS

| | | | |
|---|---|---|---|
| 5,121,388 | 6/1992 | Perdikaris et al. | 370/442 |
| 5,349,582 | 9/1994 | Bisdikian et al. | 370/440 |
| 5,402,422 | 3/1995 | Liu et al. | 370/443 |
| 5,521,925 | 5/1996 | Merakos et al. | 370/337 |
| 5,579,321 | 11/1996 | Van Griensven et al. | 370/347 |
| 5,619,504 | 4/1997 | Van Grinsven et al. | 370/347 |

*Primary Examiner*—Ajit Patel
*Assistant Examiner*—Bob A. Phunkulh
*Attorney, Agent, or Firm*—Marks & Clerk

[57] ABSTRACT

A telecommunications system comprises a plurality of servers interconnected by a TDM backbone and able to share a common channel or bandwidth. An arrangement for sending messages or files between said servers comprises a master node for sending a continuous stream of cells round the backbone, each cell having a header portion and a payload portion, and a plurality of downstream nodes which upon arrival of incoming cells insert information therein, read information therefrom, or allow the cells to pass thereby unaltered.

9 Claims, 5 Drawing Sheets

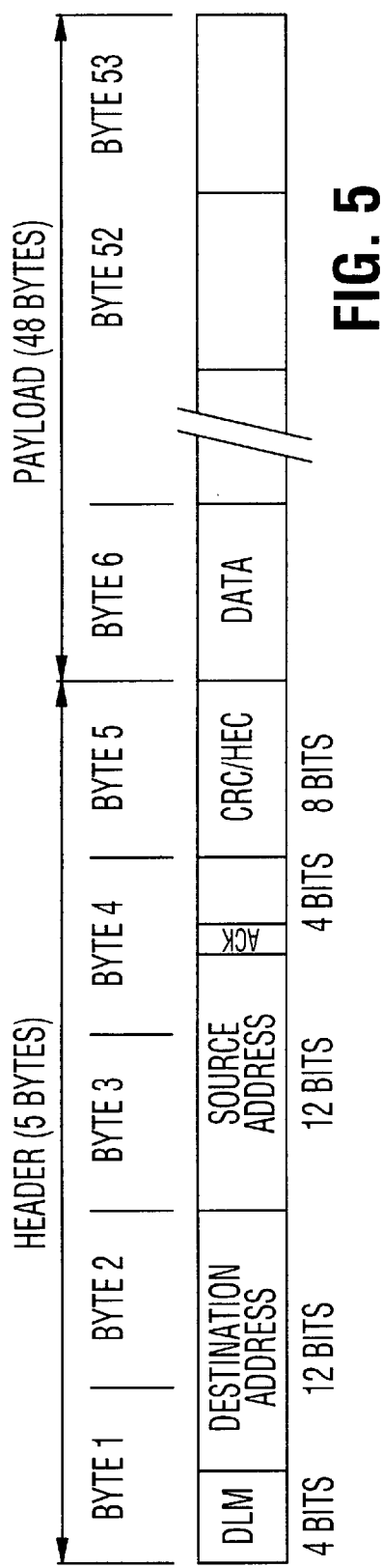
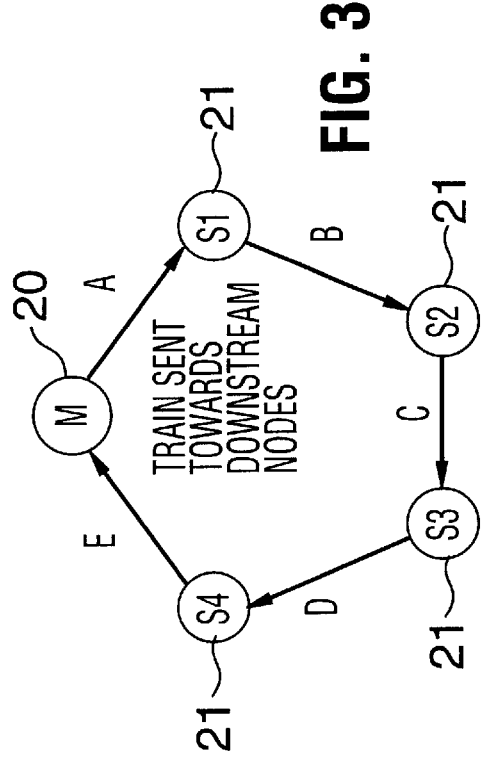
FIG. 5
FIG. 3

I - IDLE CELL (CARRIES NO INFORMATION)
S - START OF TRAIN
E - END OF TRAIN
N - START OF NEW CELLS (TRANSMISSION OF NEW CELLS IS
    ONLY ALLOWED AFTER THIS DELIMITER)
D - USER DATA CELL (CARRIES VALID USER DATA)

TELECOMMUNICATION SYSTEM WITH TRANSPORT PROTOCOL DEVICE FOR MIXING ASYNCHRONOUS SIGNALING TRAFFIC WITH TDM TRAFFIC ON A TDM BACKBONE

This invention relates to a telecommunications system, and more particularly to an arrangement for sending messages or files between servers in a system comprising a plurality of servers interconnected by a TDM backbone and able to share a common channel or bandwidth. The invention also relates to a device for implementing a TDM (Time Division Multiplex) based cell relay transport mechanism for high speed communications.

Telephony servers or MVIP (Multi-Vendor Integrated Protocol) servers interconnected by high speed TDM (Time Division Multiplex) backbones are now becoming available in the communications industry. One such system is described in our co-pending Canadian patent application no. 2109534 filed on Nov. 19, 1993. Applications of such distributed systems are: distributed PBX, Interactive Voice response systems, Video and voice mail systems, multimedia networks, Intelligent Switching Hubs, communication systems with fast messaging requirements such as hand-off signaling in wireless applications and others.

When such systems are used in association with other Mitel devices, such as the Voice/MVIP Interface circuit (VMIC), they allow the implementation of a transport system that mixes time-slot and ATM cells together in the same TDM backbone (See our co-pending application referred to above).

In such systems there is a need to establish a Common Channel Signaling/Messaging solution between telephony servers (e.g., call control data) as well as general data transfer (e.g., fax data).

Our co-pending Canadian patent application no. 2,058, 654 described a Media Access Control (MAC) mechanism that allows several servers connected to the same ring to share a common channel or bandwidth available in the ring to send messages or files between each other. This mechanism is known as a G-bus.

Existing TDM systems utilize bit oriented protocols such as HDLC or proprietary messaging to perform intermodule or interboard signaling. Other systems that are not TDM based and are used in LANs such as FDDI or token ring, utilize their own asynchronous protocols to perform Media Access Control mechanisms.

Existing signaling devices such as HDLC controllers are not designed for transmission at high speeds. Some controllers today available in the market operate up to 52 Mb/s. Other devices have throughput limitations and cannot handle messages with transmission rates beyond some hundreds of Kb/s. Other similar schemes being announced in the market today are FDDI-2 (100 Mb/s) and IsoEthernet (16 Mb/s) technologies that allow isochronous and asynchronous data to be multiplexed together on to the same physical TDM backbone.

The article entitled Implementing the Orwell Protocol over a Fibre-based High-Speed ATM network, Electronic and Communication Engineering Journal, Vol. 4, no. 6, December 1992, discloses and ATM-like protocol that sends cells round a ring. Cells can be placed on or removed from the ring at nodes. However, this article does not disclose an arrangement that permits the transport of TDM traffic on the ring.

Accordingly the present invention provides a telecommunications system comprising a plurality of servers interconnected by a high speed TDM backbone defining a plurality of timeslots, said servers being able to share a common channel or bandwidth, a master node for sending a continuous stream of cells carrying asynchronous data in the form of files or control messages round the backbone, each said cell having a header portion and a payload portion, and a plurality of downstream nodes which upon arrival of incoming cells insert information therein, read information therefrom, or allow said cells to pass thereby unaltered, characterized in that a high-speed framer on said backbone is connected to an interface device for time division multiplexed delay-sensitive traffic and to a transport protocol circuit generating said stream of cells and performing format, mapping and MAC functions to interface said cells to said TDM backbone, and said interface device generates control signals to control the transmission of cells from said transport protocol circuit to said framer so as to permit the co-existence of delay sensitive traffic from said interface device and delay non-sensitive traffic from said transport protocol circuit on said TDM backbone in a bandwidth-on-demand environment.

When the G-BUS protocol is implemented utilizing cell relay technology, signaling messages or general data of variable length can be transferred between different servers. Messages that have less than 48 bytes of length can be transferred directly to the high speed TDM backbone without being segmented/reassembled. Messages or user data with more than 48 bytes can utilize conventional off-the-shelf AAL (ATM Adaptation Layer) controllers available in the market to perform SAR (segmentation and reassembly) functions before being cell formatted.

The invention is generally implemented in the form on an integrated circuit, known as a TPI (Transport Protocol IC) device.

The physical layer convergence procedure employed by the TPI device allows the users connected by the TDM ring to implement "bandwidth on demand" functions when sharing the bandwidth with the VMIC device. As an example, from the 155 Mb/s bandwidth available on the TDM ring (up to 2430 time-slots), some applications may require 150 Mb/s for the transport of voice and video while the remaining 5 Mb/s can utilize the G-BUS cell relay protocol for the transport of data or interserver messaging. In other applications, the user may reserve 150 Mb/s for data while 5 Mb/s can be reserved for voice/video. The bandwidth on demand capabilities provided by this device, are simply controlled by the VMIC internal memories.

The present invention can increase the throughput of existing signaling systems to the range 155 Mb/s while maintaining compatibility with cell relay technology at the protocol level.

The invention will now be described in more detail, by way of example only, with reference to the accompanying drawings, in which:

FIG. 3 is a diagram of a Transport Protocol Ring;

FIG. 5 is a diagram of the G-bus cell format; and

Figure 1:
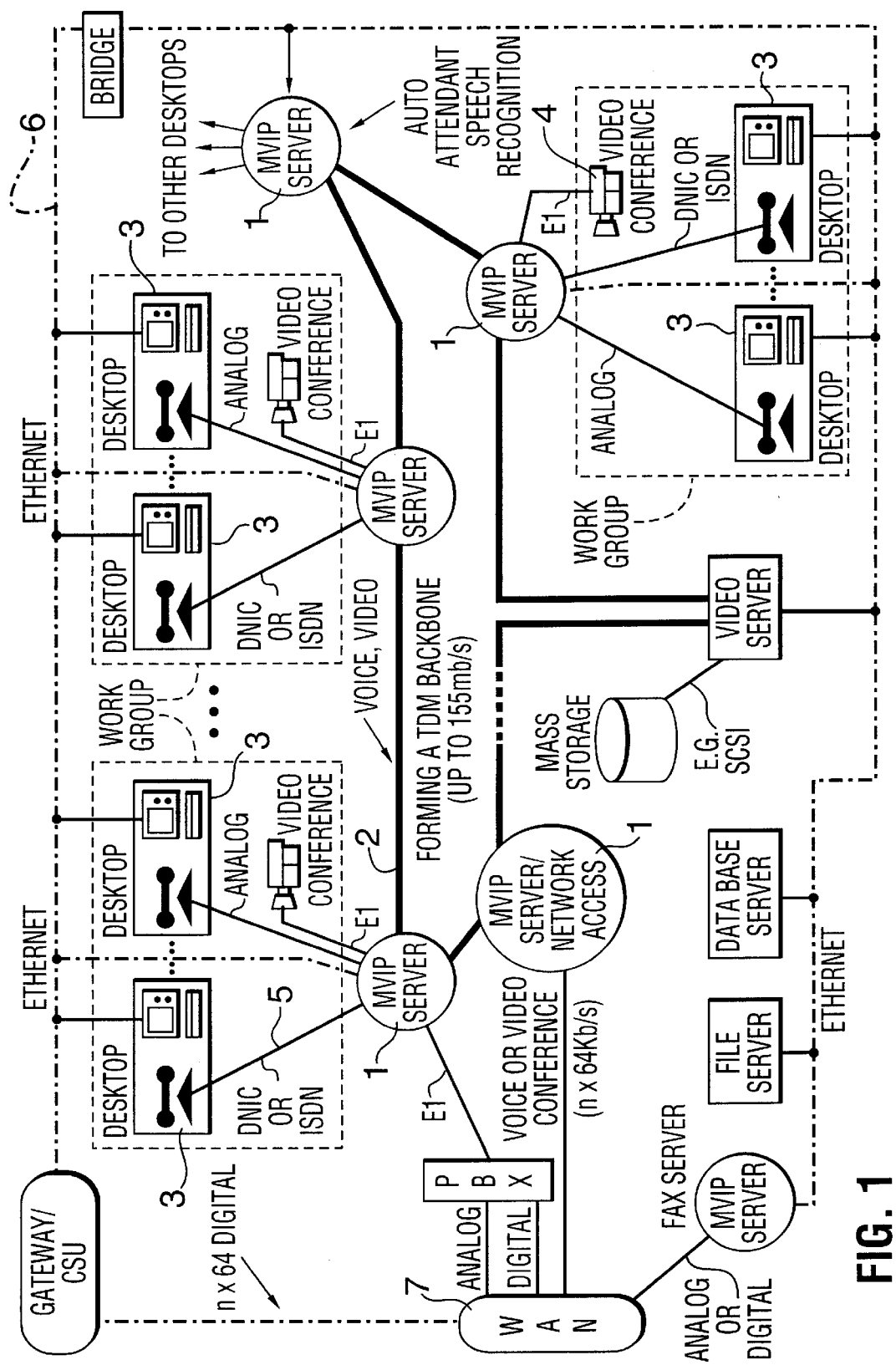
FIG. 1 is a block diagram of a distributed telephony server based on MVIP technology.

Referring now to FIG. 1, MVIP servers 1 are interconnected by a TDM backbone 2 carrying voice, video and data at speeds of up to 155 mb/s. Servers are connected to workstations 3 and video conferencing centers 4 via DNIC or ISDN links 5. The servers 1 are also linked to an Ethernet connection 6. Network access server 1a is linked to WAN 7 via n 64 kb/s channels. The invention permits the implementation of G-bus MAC protocol using ATM cells over TDM backbone 2.

Figure 2:
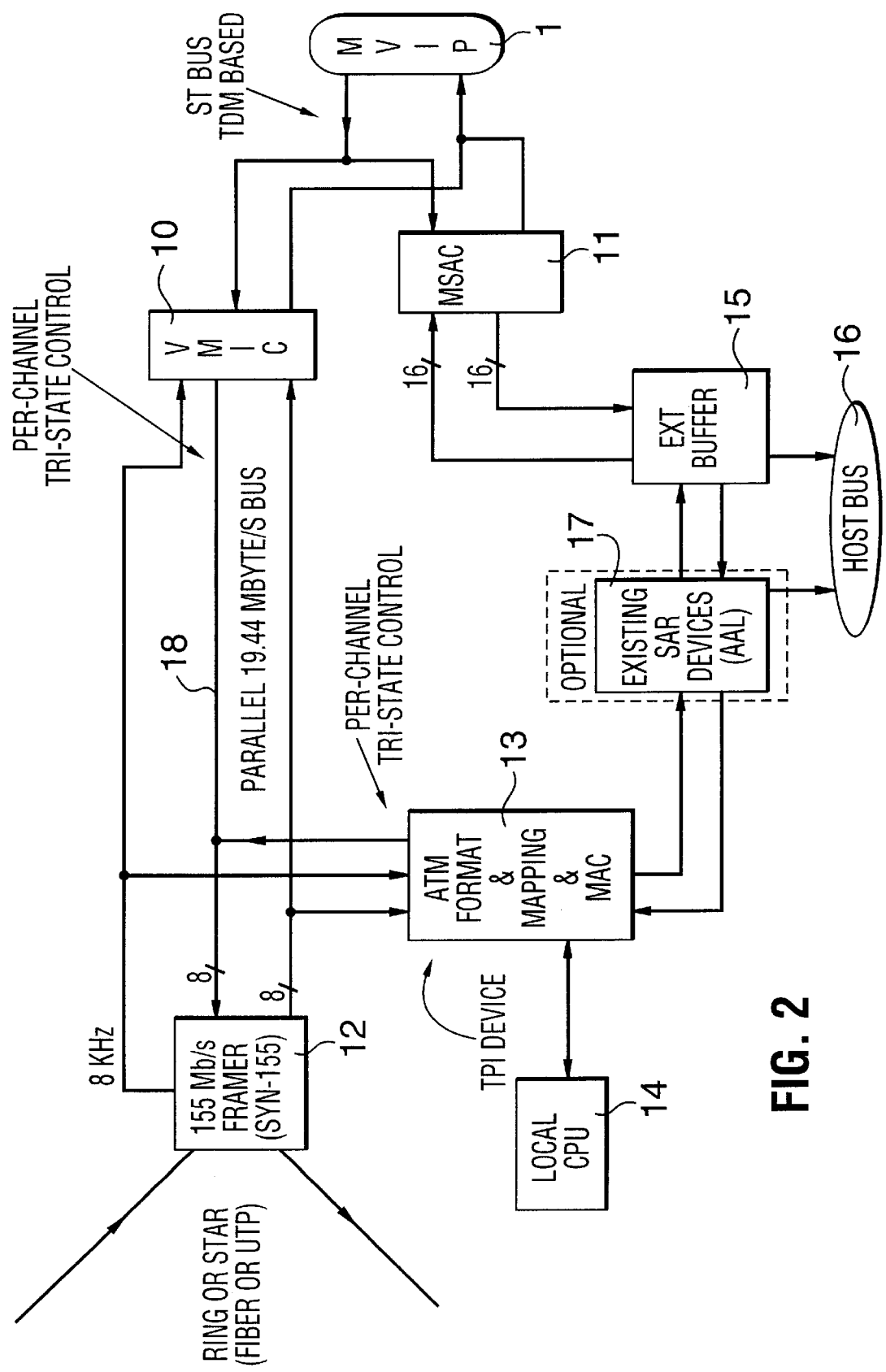
FIG. 2 is a block diagram of a system allowing ATM cells to be carried over TDM backbones.

FIG. 2 depicts a hybrid TDM/ATM local environment showing a TPI device in accordance with the invention. MVIP server 1 is connected to VMIC (Voice/Multimedia Interface Circuit) 10, which serves as an interface device for time division multiplexed delay sensitive traffic and MSAC (Isochronous to packet Converter) device 11. VMIC 10 is connected to 155 Mb/s TDM framer 12. TPI device 13, which has it own local CPU (Central Processing Unit) 14 is also connected to the Framer 12. MSAC 11 is connected through external buffer 15 to host bus 16 and existing SAR (Segmentation and Reassembly) devices 17, also connected to TPI device 13, which is shown in more detail in FIG. 6.

Figure 6:
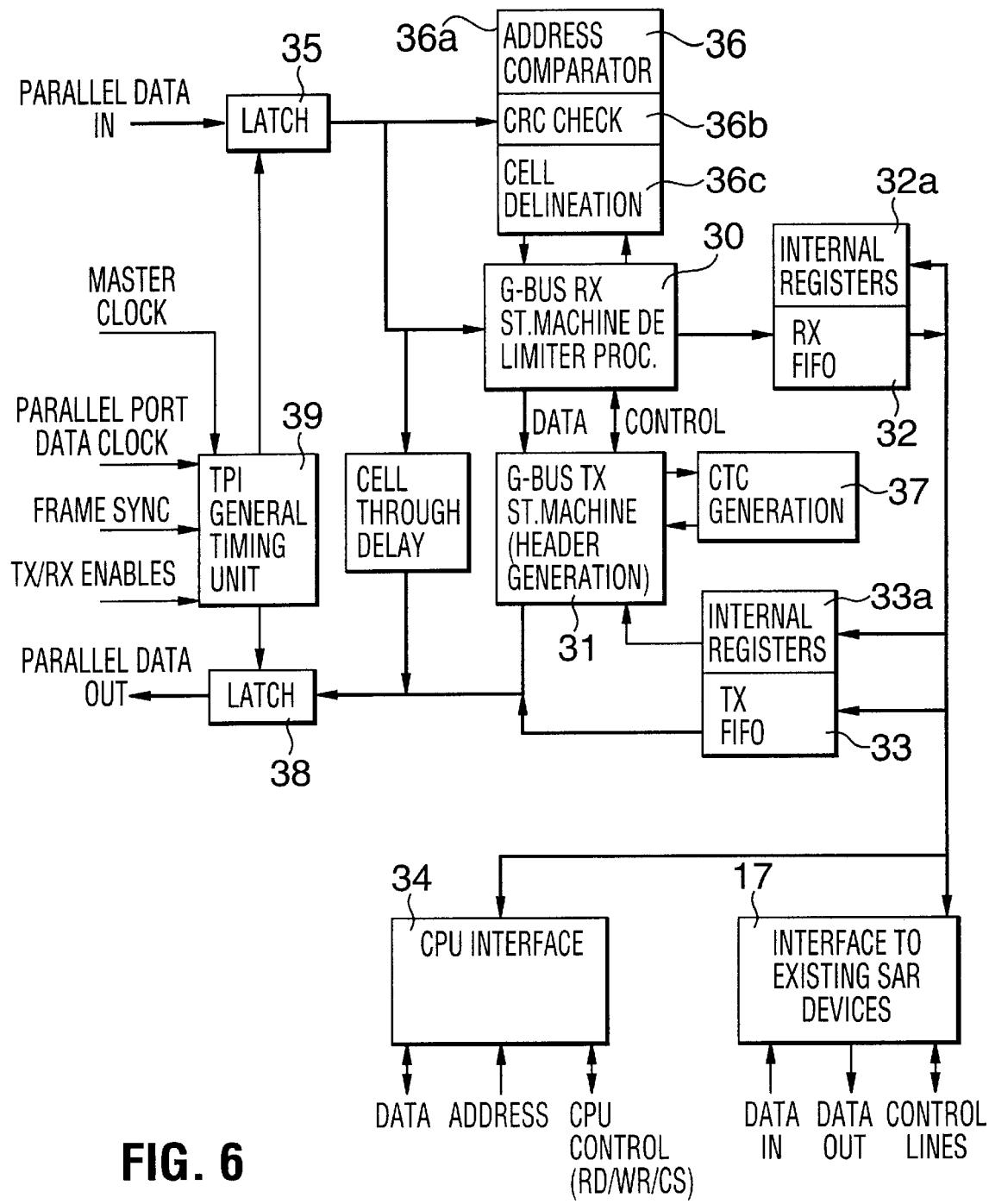
FIG. 6 is a block diagram of a TPI device.

Referring now to FIG. 6, TPI device 13 comprises receive (RX) and transmit (TX) G-bus state machines 30, 31 connected to respective receive and transmit FIFO memories 32, 33 associated with internal registers 32a, 33a. FIFO memories 32, 33 are connected to existing SAR devices 17 and CPU interface 34.

Parallel input data is fed through input latch 35 to RX G-bus state machine 30 and unit 36 consisting of address comparator 36a, CRC checker 36b, and cell delineator 36c.

TX G-bus state machine is connected to CRC generator 37 and output latch 38 from which parallel output data emerges. Timing control is provided by TPI general timing unit 39.

As shown in FIG. 2, TPI device 13 performs the format, mapping and MAC functions necessary to interface the ATM cells with the TDM Backbone.

In FIG. 2, the TPI and the VMIC devices 13, 10 share the same parallel 19.44 Mb/s bus 18 when connected to commercially available high speed serial to parallel/parallel to serial converters (e.g.; Transwitch SYN-155). The SYN-155 device will convert the internal 8 KHz based backplane at 19.44 MByte/s into a serial stream at 155 Mb/s which can be utilized in the formation of a high speed TDM ring.

The VMIC device 10 provides built-in time interchange circuits that allow time-slot switching to be performed on channels to be transported from the MVIP interface to the high speed TDM backbone and vice-versa. In addition to this capability, the VMIC device provides an internal bypass function from the parallel port input to the parallel port output allowing unused time slots to be bypassed back to the ring.

To perform the above functions, the VMIC device implements timing synchronization and memory capabilities to allow the user to program data acquisition, switching or bypass functions of up to 2430 timeslots in every 125 us. Since the VMIC's internal programmable memories are locked to the 8 KHz and byte clock timing of the high speed frame 12, the device is capable of generating output control signals (CToO-3) that are synchronized at byte level on the parallel port (up to 19.44 MByte/s). These control signals have 64 Kb/s granularity and therefore can be applied to the TPI device to control the transmission of cells on the parallel port as well as to avoid data contention between the VMIC and TPI devices when sharing the same TDM physical layer.

The transition of the VMIC's CTo signal applied to the TPI device informs the instant in time that bytes containing G-BUS cells can be received and transmitted on to the parallel port. To facilitate the acquisition of cell boundaries in applications where the number of time-slots allocated for signaling is not a multiple of an ATM cell size (53 bytes), an optional cell delineation circuit compatible to the ATM standards can be enabled by the CPU. This method allows the TPI device to be independent of physical layer and avoids the extra circuitry to generate pointers and counters.

The G-BUS Transport Protocol referred to above provides a fast messaging system with scalable bandwidth. The TPI 13 device implements the G-BUS state machines utilizing cell relay technology. It allows scalable bandwidth to allow "bandwidth on demand" systems to be created and low pass-through delay. The processing of the G-BUS state machines has to be done within the bypass time of the VMIC device (around 15 $\mu$s). Round trip of messages around the ring has is done in less than 10 ms.

The transport protocol is configured in a logical ring, with nodes attached to the ring as shown in FIG. 3. When implementing the G-BUS with cell relay technology, the ATM cell header is modified to attend to the requirements of the protocol. In the ring system, shown in FIG. 3, one of the nodes 20 is the bus master (M), employing the TPI device in master mode. All other nodes are slave nodes 21 with their respective TPI devices 13 in slave mode.

In operation master node 20 sends out a continuous stream of empty cells towards downstream nodes. Any node can fill the cells with information or let it pass by, or it can read cells with information destined for itself, and tag a header to indicate that it has read the cell. A delimiter field in the header indicates if a cell is empty or carries data.

The message size can be either limited to 48 bytes or be longer than 48 bytes. For systems that require messages with no more than 48 bytes, the TPI device 13 does not require the addition of Segmentation and Reassemble (SAR) devices and it provides internal buffers to receive user data before inserting it into the high speed backbone. For systems requiring data transfer or messages with more than 48 bytes, the TPI device provides an interface (e.g, UTOPIA BUS) to standard SAR devices available in the market (ATM Adaptation Layer devices).

Figure 4:
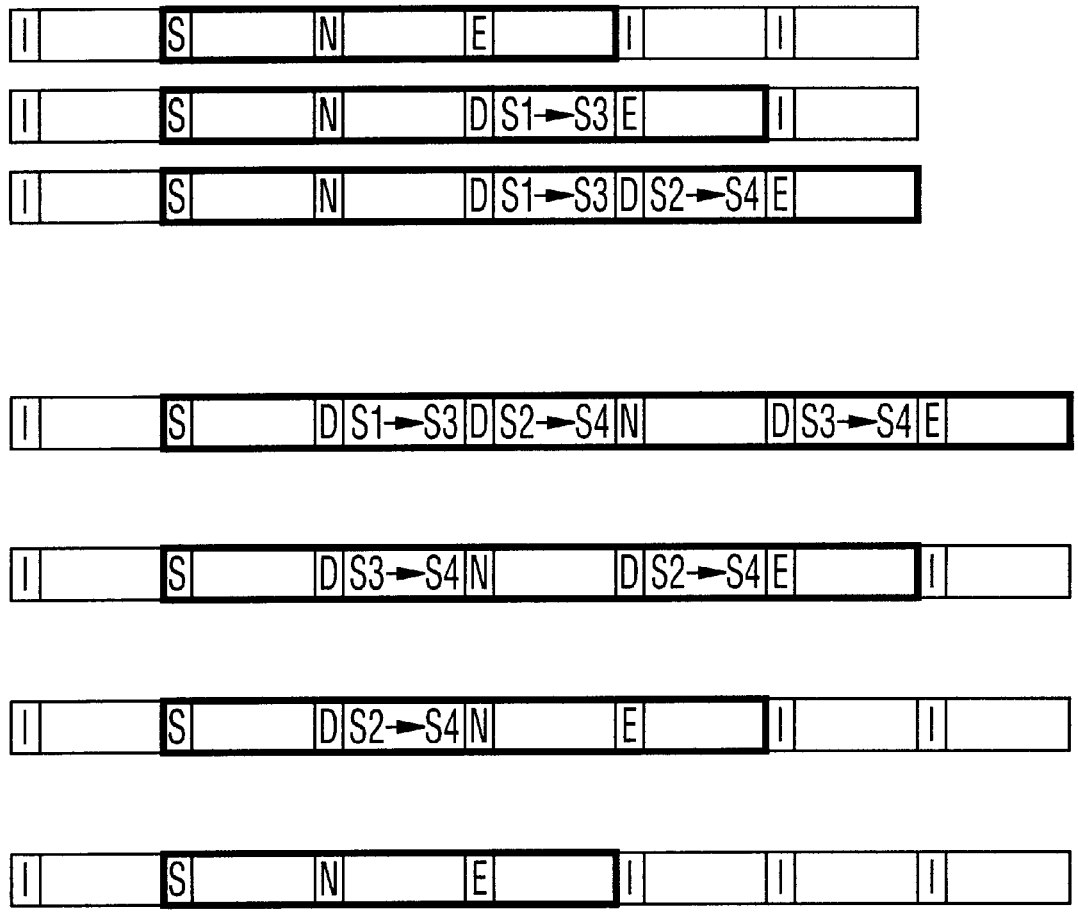
FIG. 4 is a diagram of the G-bus train format.

In the G-BUS protocol a train of cells starts at the master with a cell that has an S (start) delimiter followed by a N (new) delimiter cell, and ends with an E (end) delimiter cell as shown in FIG. 4. Each node 20, 21 can read cells addressed to itself, or it may append one or more data cells to the end of the train by overwriting the E-cell and reattaching the E cell at the end. According to the G-BUS protocol, user cells that are appended at the end of the train are transferred to the "echo" group once they pass through the master (see example in FIG. 4). Only the master node can remove cells from the train. If a cell is read by the node, an ACK bit located in the cell header will be set to avoid the cell being read more than once (the cell may rotate more than once around the ring). A priority mechanism may determine the maximum number of cells to be appended by each station.

When the train returns to the master node, the master TPI device will re-assemble the train by deleting cells that have been around for a second time (to assure each cell passed every node) and retransmitting the resulting train back towards the downstream nodes.

G-bus cells hold 53 bytes and are divided into two parts: header and payload. The header contains 5 bytes, the payload occupies 48 bytes. This cell format and size are similar the ATM cell format. Some differences exist in the use of the sub-fields in the header. Adhering to the ATM cell format will keep the option open to facilitate the transmission of data and messages over a future ATM or DQDB network.

The G-BUS cell header contains the following fields:

| | | |
|---|---|---|
| DLM | 4 bits | delimiter |
| DA | 12 bits | destination address |
| SA | 12 bits | source address |
| misc | 4 bits | miscellaneous functions |
| | | least significant bit: ACK |
| HEC | 8 bits | Header Error Control |

The first four bits in the first header byte contain a delimiter. The delimiter is encoded as follows:

| Bin.Code | Description |
|---|---|
| 0000 | idle cell (1) (carries no information) |
| 0001 | start of train (S) |
| 0010 | end of train (E) |
| 0011 | start of new cells (N) |
| 1000 | user data cell (D) (carries valid user data) |

A 24-bit address field is split into a destination address and source address of equal size, providing 4096 identifiers each. Only one bit in the miscellaneous field is defined: the acknowledge ACK bit which determines when a cell has been read by its destination.

The HEC field contains a CRC code calculated over the first four header bytes. This protection prevents the cells from ending up at the wrong destination in case of address corruption. For this purpose, the contents of the header is only considered valid after CRC validation. Another function of the HEC field is to perform the cell delineation algorithm defined by ATM standards (recommendation 1.432). This procedure is required in applications where the number of time-slots in the high speed backbone allocated for signaling is not a multiple of 53 bytes. In this case, the boundaries of a G-BUS cell may transverse two successive frames on the high speed backbone. The use of the cell delineation block is optional.

In order to insert cells, the slave node CPU places a cell in the transmit FIFO of the TPI device. The TPI will monitor the incoming stream of cells, waiting for the EOT (End of Train) cell. When the EOT cell is detected, the slave will alter the EOT delimiter into a user data delimiter, insert destination and source address, calculate the HEC, and append its data from the internal FIFO. After the user data cell has been written, the EOT cell will be appended at the end of the train.

In order to read a cell, the slave node will monitor the train for valid DATA cells to check the header's CRC, check whether the ACK bit is reset (indicating that the cell has not yet been reset) and after clocking in the data in the receiving FIFO interrupt the CPU for service.

The invention this implements a Common Channel Signaling (CCS) messaging scheme between distributed high speed systems. It allows the transport of asynchronous data over Time Division Multiplex (TDM) backbones at transmission rates up to 155 Mb/s, thus allowing a coexisting scenario where delay sensitive and non-sensitive traffic types can be transported together. It also allows the implementation of "bandwidth on demand" systems of up to 155 Mb/s. Finally, it implements G-BUS media access control mechanism (MAC) over cell relay protocol and provides asynchronous cell transport capabilities for both message and general data (when used along with existing ATM Adaptation Layer devices).

We claim:

1. A telecommunications system comprising a plurality of servers interconnected by a high speed TDM backbone defining a plurality of timeslots, said servers being able to share a common channel or bandwidth, a master node for sending a stream of cells capable of carrying asynchronous data in the form of control messages round the backbone, each said cell having a header portion and a payload portion, a plurality of downstream nodes which upon arrival of incoming cells insert information therein, read information therefrom, or allow said cells to pass thereby unaltered, a high-speed framer on said backbone is connected to an interface device for time division miltiplexed delay-sensitive traffic and to a transport protocol circuit generating said stream of cells and performing format, mapping and MAC functions to interface said cells to said TDM backbone, said interface device generating control signals to control the transmission of cells from said transport protocol circuit to said framer so as to permit the co-existence of time division multiplexed delay sensitive traffic from said interface device and asynchronous delay non-sensitive signaling, traffic from said transport protocol circuit on said TDM backbone in a bandwidth-on-demand environment.

2. A telecommunications system as claimed in claim 1, wherein said cells have a 48-byte payload portion.

3. A telecommunications system as claimed in claim 2, wherein said nodes are arranged to tag said header portion after reading a said passing cell.

4. A telecommunications system as claimed in claim 3, wherein said cells contain a delimiter field in the header portion to indicate whether they are empty or carry data in the payload portion.

5. A system as claimed in claim 1, wherein said transport protocol circuit comprises input and output data ports for receiving data from and outputting data to said framer; first and second FIFO memories for respectively storing data to be sent to and a host bus; and first and second state machines for respectively processing said cells destined for and received from said backbone.

6. A system as claimed in claim 5, further comprising an address comparator, CRC checker and cell delineator connected to said receive state machine.

7. A device as claimed in claim 6, wherein said state machines are connected to said respective data ports via latches.

8. A device as claimed in claim 5, wherein said first and second FIFO memories are connected to Segmentation and Reassembly (SAR) devices for segmenting packets into cells and reassembling cells into packets.

9. A device as claimed in claim 1, wherein said transport protocol circuit also sends data files to said framer under the control of said control signals.

* * * * *